Richard F. Broderick
INVENTOR.

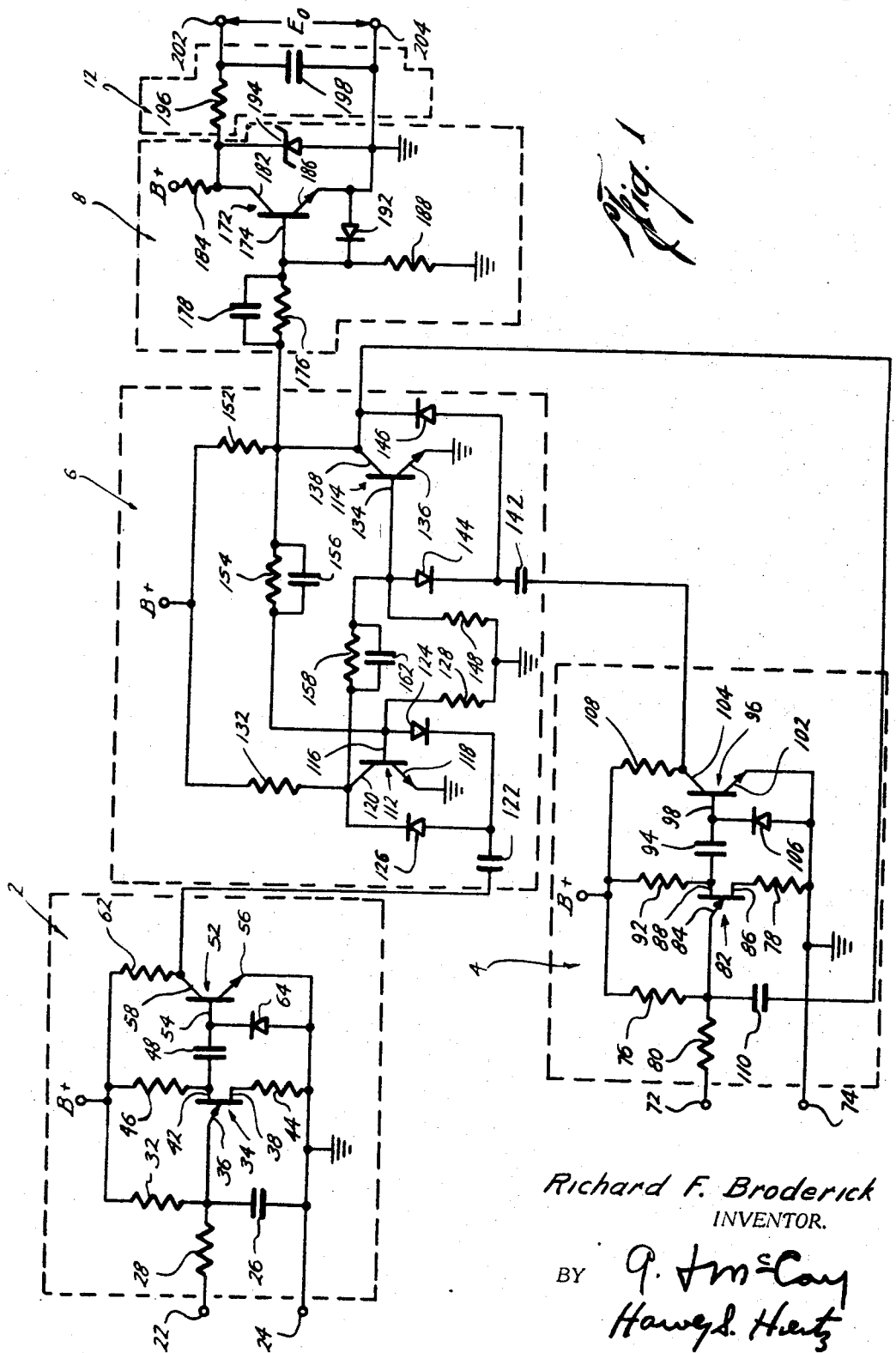

United States Patent Office 3,404,289
Patented Oct. 1, 1968

3,404,289
SIGNAL RATIO SYSTEM UTILIZING VOLTAGE CONTROLLED OSCILLATORS
Richard F. Broderick, 1502 Smallwood, Houston, Tex. 77023
Filed May 21, 1965, Ser. No. 457,874
1 Claim. (Cl. 307—235)

ABSTRACT OF THE DISCLOSURE

The invention relates to a signal ratio system wherein two signals whose ratio is to be determined are each fed into a first voltage controlled oscillator and a second voltage controlled oscillator, respectively. The voltage controlled oscillators are used to control the conduction states of a bistable flip-flop circuit. The output signal of the flip-flop circuit is then used to measure the ratio of the two input signals.

---

Figure 2A:
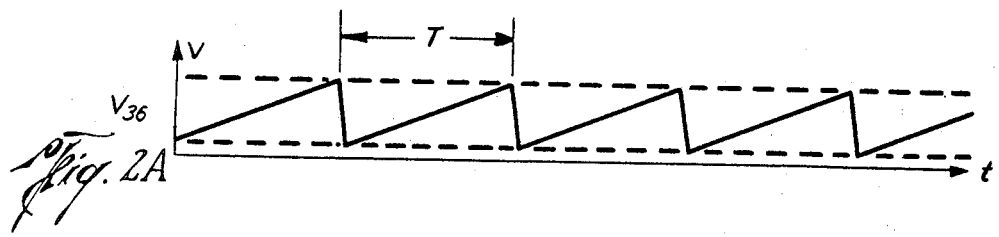
Figure 2B:
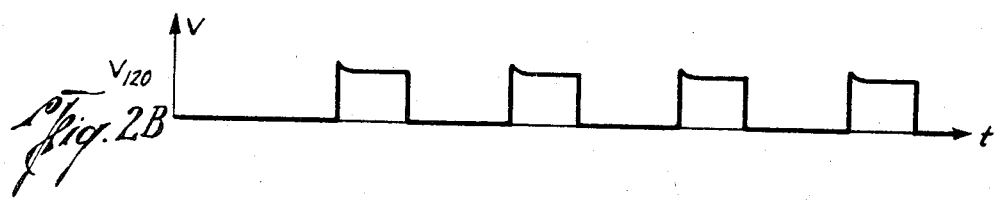

The invention described herein may be manufactured and used by or for the Government of the United States of America for governmental purposes without the payment of any royalties thereon or therefor.

The invention relates in general to signal ratio systems and, more particularly, to a system which provides an output signal whose amplitude is proportional to the amplitude of a first electrical signal divided by the amplitude of a second electrical signal.

Several different approaches have heretofore been used in order to obtain the ratio to two electrical signals. One of these systems requires the use of a servo motor wherein the first signal is fed into a servo amplifier which in turn drives a motor. The second signal is fed across the output of the circuit controlled by the motor. However, such a device is large in size and has large power requirements. Another technique for obtaining the ratio of two electrical signals employs a balanced bridge circuit in which the transconductance of an element, such as a vacuum tube or transistor, is varied. By utilizing two such elements, the voltages across these elements are used to obtain an output voltage from the bridge which represents the ratio of the two input voltages. While this form of division is relatively simple with respect to circuitry, the variable elements, which are used in the circuit, are sensitive to thermal variations and aging effects. Hence, the circuit is not particularly desirable from the consideration of stability.

Still another technique for obtaining the ratio of two signals utilizes pulse amplitude modulation. A linear ramp or sawtooth wave generator is connected as one of the inputs to a comparator (operational) amplifier. A second input voltage is fed in opposite polarity to the comparator amplifier. When the second input voltage is equal in magnitude to the voltage of the sawtooth waveform, the amplifier changes its output voltage. The output waveform of this amplifier is essentially a square wave as the comparator amplifier acts as a sensitive switch. The pulse width of this output waveform is related to the time base of the sawtooth waveform and the second input voltage to the comparator amplifier. However, the linear ramp generator is sensitive to both linearity and bias changes while the operational amplifier is sensitive to direct currents.

In order to overcome the attendant disadvantages in the prior art signal ratio systems, in the signal ratio system of the present invention the two signals, whose ratio is to be determined by the system, are each fed into a first VCO (voltage controlled oscillator) and a second VCO, respectively. The VCO's are used to control the conduction states of a bistable flip-flop circuit. The output signal of the flip-flop circuit is then utilized to measure the ratio of the two input signals.

More particularly, the system comprises a first VCO and a second VCO across which a first and a second input signal are applied, respectively. Each VCO contains a unijunction transistor. When the combination of the bias at the input terminal of the VCO, the input signal, and the charging rate due to the power supply is sufficient to cause the voltage across a charging capacitor in the charging circuit to rise to a sufficient level, the unijunction transistor becomes forward biased, and a flip-flop circuit to which both of the VCO's are coupled changes conduction states. During operation, both charging capacitors start to charge at the same time. Due to the differences in input signals and the time constants of the charging circuits, the unijunction transistor of the second VCO will become forward biased first causing the flip-flop to change conduction states. When the unijunction transistor of the first VCO becomes forward biased, the flip-flop circuit once again changes conduction states and both charging circuits again simultaneously start to charge. Output signals from the flip-flop circuit are fed into a voltage limiting circuit. The voltage limiting circuit produces an inverted square wave output of the input signal. This output signal is then fed to an averaging circuit whose output is proportional to the ratio of the input signals to the first and the second VCO's.

The advantage of this invention, both as to its construction and mode of operation, will be readily appreciated as the same become better understood by reference to the following detailed description when considered in connection with the accompanying drawings in which like reference numerals designate like parts throughout the figures, and wherein:

FIG. 1 is a circuit diagram of the novel signal ratio system in accordance with this invention; and FIGS. 2(a–f) are graphical representations of voltage-time waveshapes of the circuit of FIG. 1.

Referring now to FIG. 1, there is shown the signal ratio system containing a first VCO 2 and a second VCO 4. The output of the VCO's 2 and 4 are each coupled to a flip-flop circuit 6 comprising a transistorized bistable multivibrator. The output terminal of the flip-flops is connected back to the VCO 4 and also is connected to a voltage limiting circuit 8. The output of the voltage limiting circuit 8 is connected to an averaging circuit 12 from which output signals of the system are derived.

More particularly, the first VCO 2 comprises a pair of input terminals 22, 24, across which a first input signal and a biasing signal may be applied. A charging capacitor 26 is connected on one side to ground and on the other side to the terminal 22 through a resistor 28 which prevents the capacitor 26 from being short-circuited. The other side of the capacitor 26 is also connected to a source of positive potential through a charging resistor 32 and to a unijunction transistor 34 at its emitter 36. The unijunction transistor further contains a first base 38 and a second base 42. The first base 38 is connected to ground through a resistor 44 which forms the discharge path for the capacitor 26 when the unijunction transistor becomes forward biased. Output signals from the unijunction transistor are taken at the base 42 which is connected to the source of positive potential through a resistor 46. A coupling capacitor 48 interconnects the base 42 with an output transistor 52 at its base 54. The transistor 52 further contains an emitter 56, which is connected directly to ground, and a collector 58 which is connected through a resistor 62 to a source of positive potential. Further, a diode 64, having its cathode connected to the base 54 and its anode connected to the emitter 56, prevents the transistor 52 from breaking down when it is reverse biased.

The second VCO 4 is similar in design to the VCO 2 and contains a pair of input terminals 72, 74, a charging resistor 76, discharging resistor 78, input resistor 80, unijunction transistor 82 having an emitter 84, a first base 86, and a second base 88. The VCO 4 further comprises a resistor 92 which connects the base 88 to a source of positive potential, and a capacitor 94, the capacitor 94 being connected to an output transistor 96 having a base 98, emitter 102, and collector 104. Further, a diode 106 is connected across the base-emitter terminals of the transistor 96. A resistor 108 is connected between the source of positive potential and the collector 104. The aforedescribed VCO 2 is similar in nature to the VCO 4 except for a charging capacitor 110 which is connected between the charging resistor 76 and the output terminal of the flip-flop circuit 6.

The flip-flop 6 comprises a first transistor 112 and a second transistor 114. The transistor 112 comprises a base 116, an emitter 118, and collector 120. The VCO 2 is connected from the collector 58 of transistor 52 to one side of a capacitor 122. The other side of the capacitor 122 is connected to the base 116 of transistor 112 through a steering diode 124 having its anode connected to the base 116 and its cathode connected to the capacitor 122. Further, the capacitor 122 is connected to the collector 120 of transistor 112 through a leakage diode 126 having its anode connected to the capacitor 122 and its cathode connected to the collector 120. The base 116 is further connected through a resistor 128 to ground. The emitter 118 is connected to ground and the collector 120 is connected to a source of positive potential through a resistor 132.

The transistor 114 comprises a base 134, emitter 136, and collector 138. The collector 104 of transistor 96 is coupled to one side of a capacitor 142. The other side of the capacitor 142 is connected to the base 134 of transistor 114 through a steering diode 144 whose cathode is connected to the capacitor 142 and whose anode is connected to the base 134. Further, a leakage diode 146 is connected at its cathode to the collector 138 and at its anode to the capacitor 142. The base 134 of transistor 114 is connected to ground through a resistor 148, and the collector 138 is connected to a source of positive potential through a biasing resistor 152. The emitter 136 is connected to ground and the collector 138 is connected to the base 116 of transistor 112 through the parallel combination of a resistor 154 and a capacitor 156. The collector 120 of transistor 112 is connected to the base 134 through the parallel combination of a resistor 158 and capacitor 162.

Output signals from the flip-flop circuit are taken from the collector 138 and are coupled to a transistor 172 in the voltage-limiting circuit 8 at its base 174 through a parallel combination of a resistor 176 and capacitor 178 which prevents the loading of the flip-flop circuit 6. The collector 182 of the transistor 172 is connected to a source of positive potential through a biasing resistor 184, and the emitter 186 of the transistor 172 is connected to ground. Further, the base 174 is connected through a leakage resistor 188 to ground, and a diode 192, which prevents the transistor 172 from breaking down when in reverse bias condition, has its cathode connected to the base 174 and its anode connected to the emitter 186. A Zener diode 194 has its cathode connected to the collector 182 and its anode connected to the emitter 186.

The output voltage across the Zener diode is fed into the averaging circuit 12. The averaging circuit comprises a resistor 196 and a capacitor 198. The resistor 196 is connected between the cathode of the Zener diode 194 and a first output terminal 202, and the capacitor 198 is connected across the first output terminal 202 and a second output terminal 204.

With the foregoing in mind, operation of the circuit of FIG. 1, with reference to the voltages depicted in FIGS. 2(a-f) is as follows:

A first input signal and a second input signal, the ratio of whose voltages are obtained at the output terminals 202, 204, are applied to the input terminals of VCO 2 and VCO 4, respectively. Initially, it is assumed that transistor 112 is conductive and the transistor 114 is in its nonconductive state. With the transistor 114 nonconductive, the capacitor 110 is effectively disconnected from the charging circuit of the VCO 4.

However, the capacitor 26 of VCO 2 is connected directly to ground and starts to charge. As the capacitor 26 of VCO 2 charges, the voltage at the emitter 36, shown in FIG. 2a rises for a time period T until the unijunction transistor 34 becomes forward biased and the capacitor 26 discharges through resistor 44. At the time of discharge, a positive going pulse is applied to the capacitor 48 causing the transistor 52 to conduct. The conduction of transistor 52 causes the capacitor 122 to apply a negative voltage to the base 116 of transistor 112 through the steering diode 124 causing the transistor 112 to cut off. With the transistor 112 cut off, the voltage at the collector 120, shown in FIG. 2b, rises sharply toward the source of positive potential and this voltage is applied to base 134 causing the transistor 114 to be conductive. The voltage at the collector 138, shown in FIG. 2c which is also the output voltage of the flip-flop circuit, is reduced to zero and allows the capacitor 110 of VCO 4 to start charging. Simultaneously, the capacitor 26 of VCO 2 again starts to charge.

The operation of VCO 4 is identical to that of VCO 2. The capacitor 110 starts to charge and the voltage at the emitter 84 starts to rise (the voltage at the emitter 84 being shown in FIG. 2d) for a time period τ until the unijunction transistor becomes forward biased and, as in the operation of VCO 2, a negative pulse is applied to the base 134 through the steering diode 144 cutting off the transistor 114 and causing the transistor 112 to conduct until the unijunction transistor 34 becomes forward biased and the cycle is repeated.

Figure 2C:
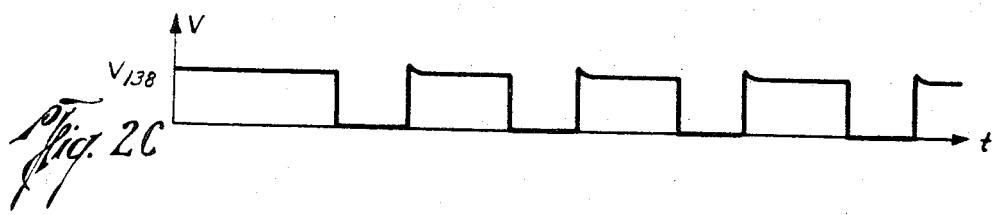
Figure 2D:
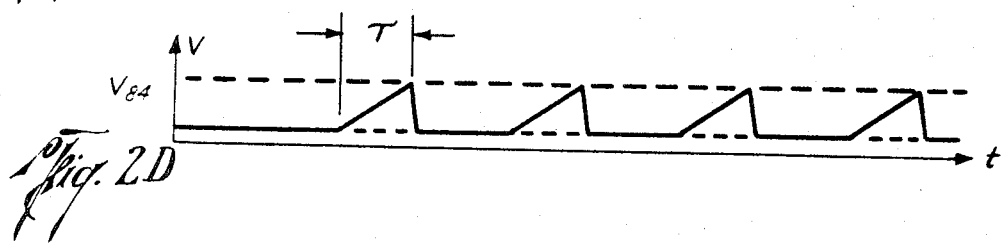
Figure 2E:
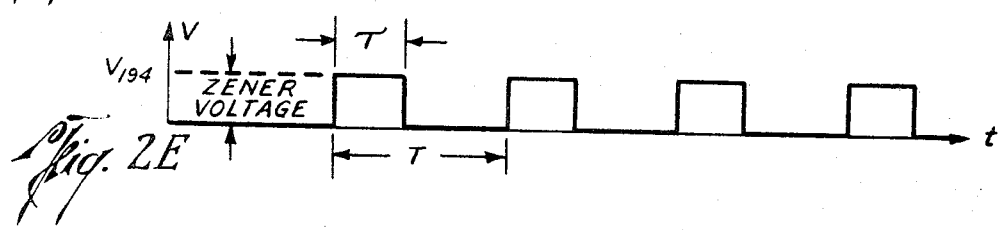
Figure 2F:
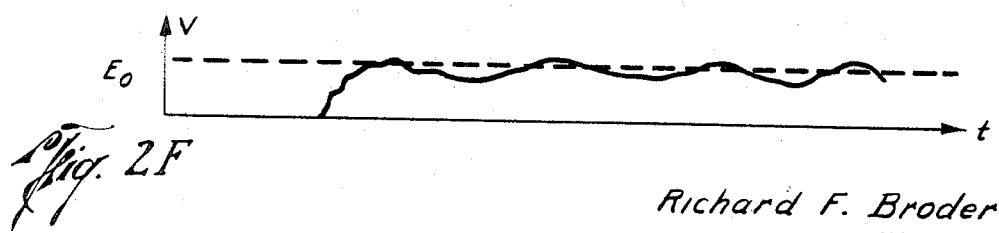

The voltage at the collector 138, which is the output voltage of the flip-flop circuit (as shown in FIG. 2c), is fed into the limiting circuit 8 and is inverted by the transistor 172. This inverted voltage is applied across the Zener diode 194 with a resultant signal across the Zener diode, as shown in FIG. 2e. The output voltage across the Zener diode is fed into the averaging circuit 12, the output of which (shown in FIG. 2f) is taken off of terminals 202, 204 and is proportional to the signal applied to the terminals 72, 74 divided by the signal applied to the terminals 22, 24.

The input signals which are applied to the VCO 2 and the input of the VCO 4 are coupled to the charging capacitors 26 and 110, respectively. As the input signal to the VCO 2 varies, the time period τ (of FIG. 2a) will vary; thus should a larger signal be applied to the input of VCO 2, a shorter time period τ will be needed before the unijunction transistor 34 becomes forward biased. Conversely, should a small signal be applied to the input terminals of VCO 2, a longer time period τ will be required until the unijunction transistor 34 becomes forward biased. Similarly, the input signal applied to the VCO 4 which is coupled to the charging capacitor 110 controls the operation of unijunction transistor 82. Thus, as can be readily seen, the output signal at terminals 202, 204 is proportional to the input signal applied to the input of VCO 4, divided by the input signal applied to the input of VCO 2, and as these input signals vary, the output signal will also vary.

It should be further understood that the foregoing disclosure relates only to preferred embodiments of the invention, and that it is intended to cover all changes and modifications of the examples of the invention herein chosen for the purpose of the disclosure which do not constitute departures for the spirit and scope of the invention.

What is claimed and desired to be secured by Letters Patent is:

1. A signal ratio system for producing an output signal proportional to the ratio of magnitudes of a first input signal and second input signal comprising:

(a) a first voltage controlled oscillator comprising a pair of input terminals across which said first input signal is applied, a charging circuit for producing a sawtooth voltage having a time-base proportional to the magnitude of said first input signal, a unijunction transistor having an emitter, a first base and a second base, said charging circuit being coupled to the emitter of said unijunction transistor, a discharging circuit coupled to the first base of said unijunction transistor, and an output transistor having a base, emitter, and collector, the second base of said unijunction transistor being coupled to the base of said output transistor;

(b) a second voltage controlled oscillator comprising a pair of input terminals across which said second input signal is applied, a charging circuit for producing a sawtooth voltage having a time-base proportional to the magnitude of said second input signal, a unijunction transistor having an emitter, a first base and a second base, said charging circuit being coupled to the emitter of said unijunction transistor, a discharging circuit coupled to the first base of said unijunction transistor, and an output transistor having a base, emitter, and collector, the second base of said unijunction transistor being coupled to the base of said output transistor;

(c) a flip-flop circuit having a first transistor having a base, emitter, and collector, and a second transistor having a base, emitter, and collector, a first capacitor coupling the collector of said first voltage controlled oscillator output transistor to the base of said first flip-flop transistor, and a second capacitor coupling the collector of said second voltage controlled oscillator output transistor to the base of said second flip-flop transistor, and means connecting the collector of said second flip-flop transistor to the charging circuit of said second voltage controlled oscillaor for controlling the charging period of the charging circuit of said second voltage controlled oscillator;

the charging period of the charging circuit of said second voltage controlled oscillator commencing when said second flip-flop transistor is in a conduction state;

(d) a voltage limiting circuit coupled to the collector of said flip-flop transistor for inverting the signal at the said collector and producing a signal having a fixed amplitude; and (e) an averaging circuit coupled to said voltage limiting circuit for converting said signal of fixed amplitude to said ratio output signal.

References Cited

UNITED STATES PATENTS

| | | | |
|---|---|---|---|
| 2,894,215 | 7/1959 | Toy | 307—88.5 |
| 3,026,505 | 3/1962 | Bevilacqua | 307—88.5 |
| 3,205,348 | 9/1965 | Kleinberg | 328—161 |
| 3,230,480 | 1/1966 | Prather | 307—88.5 |
| 3,278,737 | 11/1966 | Germain | 328—161 |
| 3,303,493 | 2/1967 | Charbonnier | 307—88.5 |

ARTHUR GAUSS, *Primary Examiner.*

H. DIXON, *Assistant Examiner.*